United States Patent
Gardner et al.

(10) Patent No.: US 10,250,617 B1
(45) Date of Patent: Apr. 2, 2019

(54) SYSTEMS AND METHODS FOR DETECTING MALWARE USING MACHINE LEARNING

(71) Applicant: Symantec Corporation, Mountain View, CA (US)

(72) Inventors: Andrew Gardner, Rosewell, GA (US); Walter Bogorad, Danville, CA (US); Jun Mao, Torrance, CA (US)

(73) Assignee: Symantec Corporation, Mountain View, CA (US)

(*) Notice: Subject to any disclaimer, the term of this patent is extended or adjusted under 35 U.S.C. 154(b) by 261 days.

(21) Appl. No.: 14/948,341

(22) Filed: Nov. 22, 2015

(51) Int. Cl.
| | | |
|---|---|---|
| *H04L 29/06* | (2006.01) | |
| *G06F 17/30* | (2006.01) | |
| *G06N 3/08* | (2006.01) | |
| *G06F 16/26* | (2019.01) | |

(52) U.S. Cl.
CPC .......... *H04L 63/1416* (2013.01); *G06F 16/26* (2019.01); *G06F 17/30572* (2013.01); *G06N 3/08* (2013.01); *H04L 63/145* (2013.01)

(58) Field of Classification Search
CPC ............... H04L 63/1416; H04L 63/145; G06F 17/30572; G06N 3/08
See application file for complete search history.

(56) References Cited

U.S. PATENT DOCUMENTS

| | | | | |
|---|---|---|---|---|
| 5,167,008 A * | 11/1992 | Engeler | ................ | G06N 3/0481 706/34 |
| 7,720,848 B2 * | 5/2010 | Guerraz | ............ | G06F 17/30705 707/737 |
| 7,849,032 B1 * | 12/2010 | Campos | .................... | G06N 3/08 706/15 |
| 9,213,990 B2 * | 12/2015 | Adjaoute | ........... | G06Q 20/4016 |
| 2003/0065926 A1 * | 4/2003 | Schultz | ................ | G06F 21/562 713/188 |
| 2004/0059697 A1 * | 3/2004 | Forman | ................ | G06K 9/6228 706/46 |
| 2004/0076944 A1 * | 4/2004 | Chan | ........................ | G06N 3/08 434/433 |
| 2006/0037080 A1 * | 2/2006 | Maloof | ................. | G06F 21/562 726/24 |

(Continued)

OTHER PUBLICATIONS

Peng, Hao et al., "Using probabilistic generative models for ranking risks of Android apps", http://dl.acm.org/citation.cfm?doid=2382196.2382224, as accessed Sep. 21, 2015, CCS '12, Proceedings of the 2012 ACM Conference on Computer and Communications Security, (Oct. 16-18, 2012).

(Continued)

*Primary Examiner* — John B King
(74) *Attorney, Agent, or Firm* — FisherBroyles, LLP (57) ABSTRACT

A computer-implemented method for detecting malware using machine learning may include (1) identifying data to be analyzed for malware, (2) classifying, using a classifier created by a combination of at least one deep learning neural network and at least one supervised data mining method, the data to be analyzed for malware, (3) determining, based on a predefined threshold, that the classification of the data indicates potential malware on the computing device, and (4) performing a security action based on the determination of potential malware on the computing device. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0030842 A1* | 2/2007 | Borden | G06K 9/6215 |
| | | | 370/352 |
| 2007/0094201 A1* | 4/2007 | Dejean | G06F 17/2247 |
| | | | 706/47 |
| 2012/0323829 A1* | 12/2012 | Stokes | G06F 21/563 |
| | | | 706/12 |
| 2016/0034814 A1* | 2/2016 | Audhkhasi | G06N 3/08 |
| | | | 706/12 |
| 2017/0099200 A1* | 4/2017 | Ellenbogen | H04L 43/04 |
| 2018/0082172 A1* | 3/2018 | Patel | G06N 3/0472 |

OTHER PUBLICATIONS

Arp, Daniel et al., "DREBIN: Effective and Explainable Detection of Android Malware in Your Pocket", http://user.informatik.uni-goettingen.de/~krieck/docs/2014-ndss.pdf, as accessed Sep. 21, 2015, NDSS '14, San Diego, CA, (Feb. 23-26, 2014).

Yuan, Zhenlong et al., "Droid-Sec: Deep Learning in Android Malware Detection", SIGCOMM'14, Chicago, IL, (Aug. 17-22, 2014).

\* cited by examiner

SYSTEMS AND METHODS FOR DETECTING MALWARE USING MACHINE LEARNING

BACKGROUND

Malware can cause serious problems for computing systems, and the detection of malware poses a difficult challenge as malicious software constantly evolves. Data mining solutions have sometimes been used to analyze various data on a computing device in the effort to detect malware. Traditionally, data mining techniques use structured data analysis to detect patterns and anomalies that can explain various phenomena. By using data analysis to detect patterns based on known malware, these solutions may be able to use similar patterns to also detect the potential for new instances of malware. Thus, these solutions may provide better security by recognizing signs of malware that may not yet be known.

However, some data is not easily analyzed by traditional data mining methods. For example, data that is not easily labeled or that does not conform to a standard format may be difficult for traditional methods to process. In some cases, the information that may be extracted from this data is lost in the process of formally defining strict categories used to classify whether the data may indicate malware. At the same time, other methods that may be able to process this data may not be able to process more complex, structured data that could provide more detailed analyses of malware. Because of the difficulty in mining both unstructured and complex data, more advanced solutions are needed to accurately detect computer malware. Accordingly, the instant disclosure identifies and addresses a need for additional and improved systems and methods for identifying malware through data mining methods.

SUMMARY

As will be described in greater detail below, the instant disclosure generally relates to systems and methods for detecting malware using machine learning by combining deep learning neural networks with supervised data mining methods. The disclosed systems may use the combination of techniques to create a classifier to detect malware. Additionally, these systems may classify data about a computing device to determine whether the computing device is infected with malware. Furthermore, the disclosed systems may then use security measures to combat a potential malware threat.

In one example, a computer-implemented method for detecting malware using machine learning may include (1) identifying data to be analyzed for malware, (2) classifying, using a classifier created by a combination of at least one deep learning neural network and at least one supervised data mining method, the data to be analyzed for malware, (3) determining, based on a predefined threshold, that the classification of the data indicates potential malware on the computing device, and (4) performing a security action based on the determination of potential malware on the computing device. In some examples, identifying the data to be analyzed for malware may include identifying data on the computing device, receiving data from a client device, and/or downloading data from a network.

In one embodiment, the deep learning neural network may include multiple layers of artificial neural networks configured to accomplish hierarchical feature extraction, semi-supervised machine learning, and/or unsupervised machine learning. In an additional embodiment, the supervised data mining method may include a decision tree, a vector machine, a supervised neural network, an ensemble method, and/or regression analysis.

In one example, the combination of the deep learning neural network and the supervised data mining method may include feature extraction with the supervised data mining method and classification of features with the deep learning neural network. In this example, the feature extraction with the supervised data mining method may include converting training data into leaf nodes and converting the leaf nodes into features using a bag-of-words model. In another example, the combination of the deep learning neural network and the supervised data mining method may include feature extraction with the deep learning neural network and classification of features with the supervised data mining method.

In some embodiments, classifying the data to be analyzed for malware may include predicting the classification of the data to be analyzed for malware with the classifier created using training data. In these embodiments, the training data may include an example of malware, an example of safe software, data about a computing system infected by malware, and/or data about a computing system without malware. Additionally, in other embodiments, the predefined threshold for classification may include a degree of likelihood that the classification of the data to be analyzed for malware accurately identifies malware.

In one example, the computer-implemented method may further include creating a new classifier, using the combination of the deep learning neural network and the supervised data mining method, with updated training data. In this example, the updated training data may include new training data gathered periodically and/or addition of the data to be analyzed for malware.

In one embodiment, a system for implementing the above-described method may include (1) an identification module, stored in memory, that identifies data to be analyzed for malware, (2) a classification module, stored in memory, that classifies, using a classifier created by a combination of at least one deep learning neural network and at least one supervised data mining method, the data to be analyzed for malware, (3) a determination module, stored in memory, that determines, based on a predefined threshold, that the classification of the data indicates potential malware on the computing device, and (4) a security module, stored in memory, that performs a security action based on the determination of potential malware on the computing device. In addition, the system may include at least one processor that executes the identification module, the classification module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify data to be analyzed for malware, (2) classify, using a classifier created by a combination of at least one deep learning neural network and at least one supervised data mining method, the data to be analyzed for malware, (3) determine, based on a predefined threshold, that the classification of the data indicates potential malware on the computing device, and (4) perform a security action based on the determination of potential malware on the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malware using machine learning. As will be explained in greater detail below, by combining deep learning and supervised data mining techniques, the disclosed systems and methods may process data that is difficult to mine using traditional methods alone. For example, the disclosed systems and methods may use a combination of methods to create a classifier from training data that can identify patterns of malware. By applying the classifier to data obtained from a computing device, the disclosed systems and methods may also detect potentially unknown malware on the device and work to mitigate the potential threat.

Figure 1:
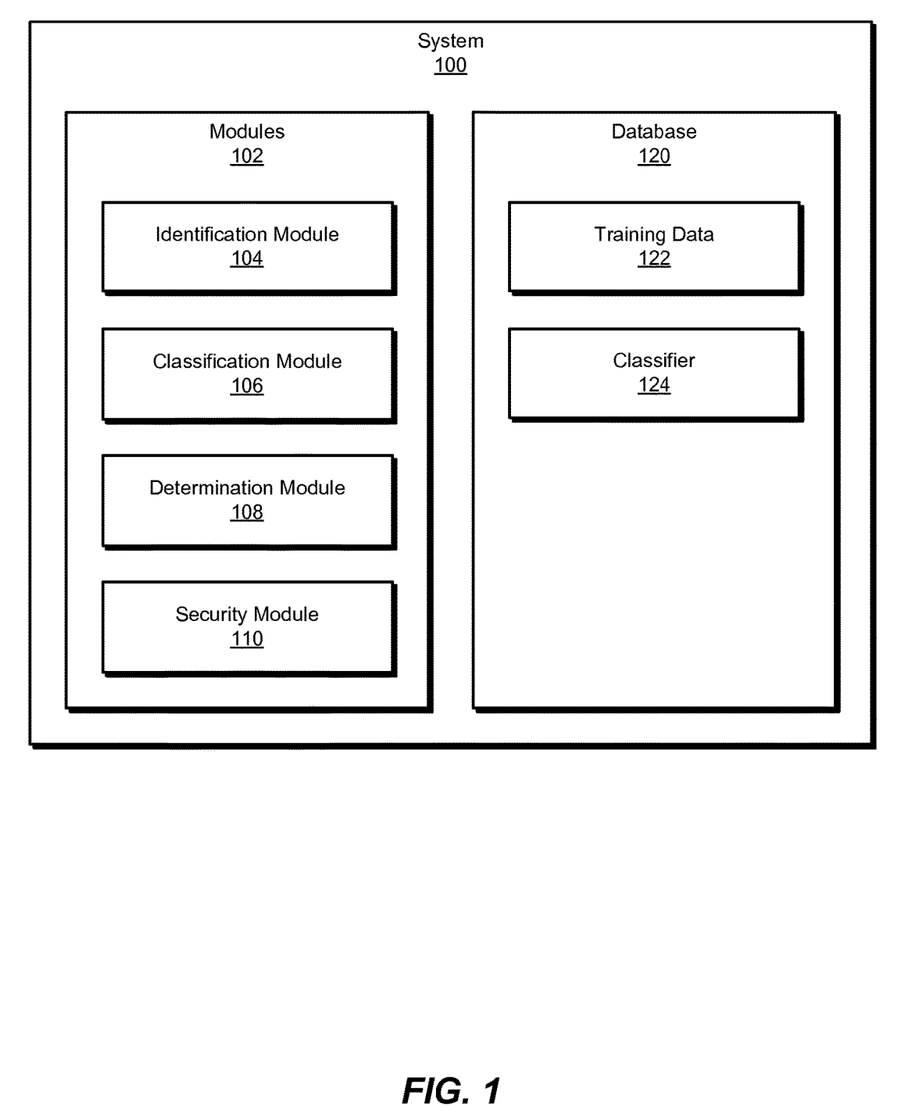
FIG. 1 is a block diagram of an exemplary system for detecting malware using machine learning.
Figure 2:
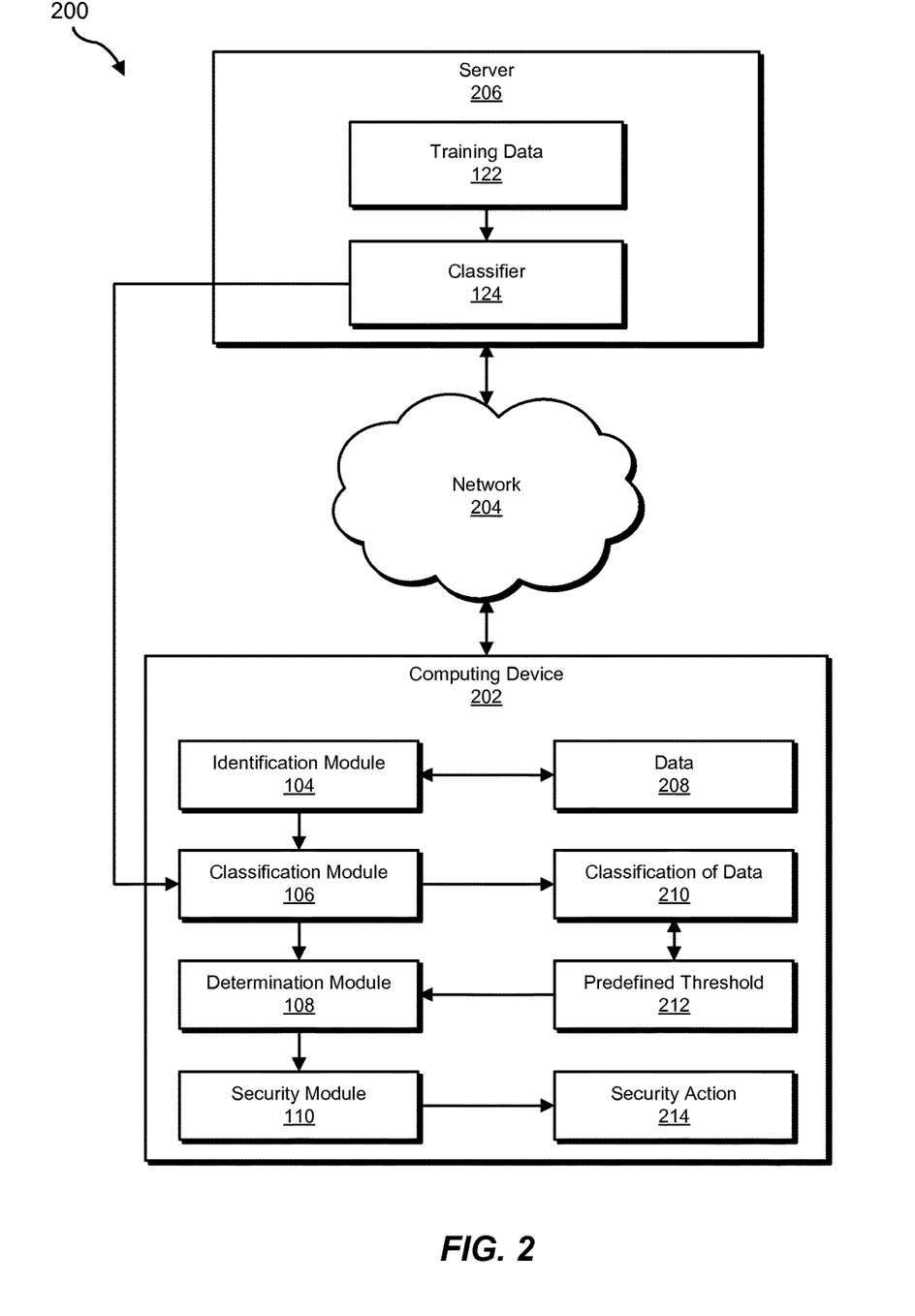
FIG. 2 is a block diagram of an additional exemplary system for detecting malware using machine learning.

The following will provide, with reference to FIGS. 1 and 2, detailed descriptions of exemplary systems for detecting malware using machine learning. Detailed descriptions of corresponding computer-implemented methods will also be provided in connection with FIG. 3. In addition, detailed descriptions of an exemplary creation of a classifier using a combination of deep learning neural networks and supervised data mining methods will be provided in connection with FIG. 4. Furthermore, detailed descriptions of an exemplary creation of a new classifier with exemplary additional training data will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting malware using machine learning. The term "machine learning," as used herein, generally refers to algorithms used to learn from data patterns in order to make predictions. As illustrated in FIG. 1, exemplary system 100 may include one or more modules 102 for performing one or more tasks. For example, and as will be explained in greater detail below, exemplary system 100 may include an identification module 104 that may identify data to be analyzed for malware. Exemplary system 100 may additionally include a classification module 106 that may classify, using a classifier created by a combination of at least one deep learning neural network and at least one supervised data mining method, the data to be analyzed for malware. The term "deep learning neural network," as used herein, generally refers to a machine learning method that can learn from unlabeled data using multiple processing layers in a semi-supervised or unsupervised way. The term "supervised data mining method," as used herein, generally refers to machine learning and data mining methods that learn to make predictions using analysis of labeled training data, with the assumption that the training data may indicate an expected phenomenon.

Exemplary system 100 in FIG. 1 may also include a determination module 108 that may determine, based on a predefined threshold, that the classification of the data indicates potential malware on the computing device. Furthermore, exemplary system 100 may include a security module 110 that may perform a security action based on the determination of potential malware on the computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store training data 122, which may be used in machine learning to recognize malware patterns. Additionally or alternatively, database 120 may store classifier 124, which may then be used to detect potential malware.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG.

Figure 6:
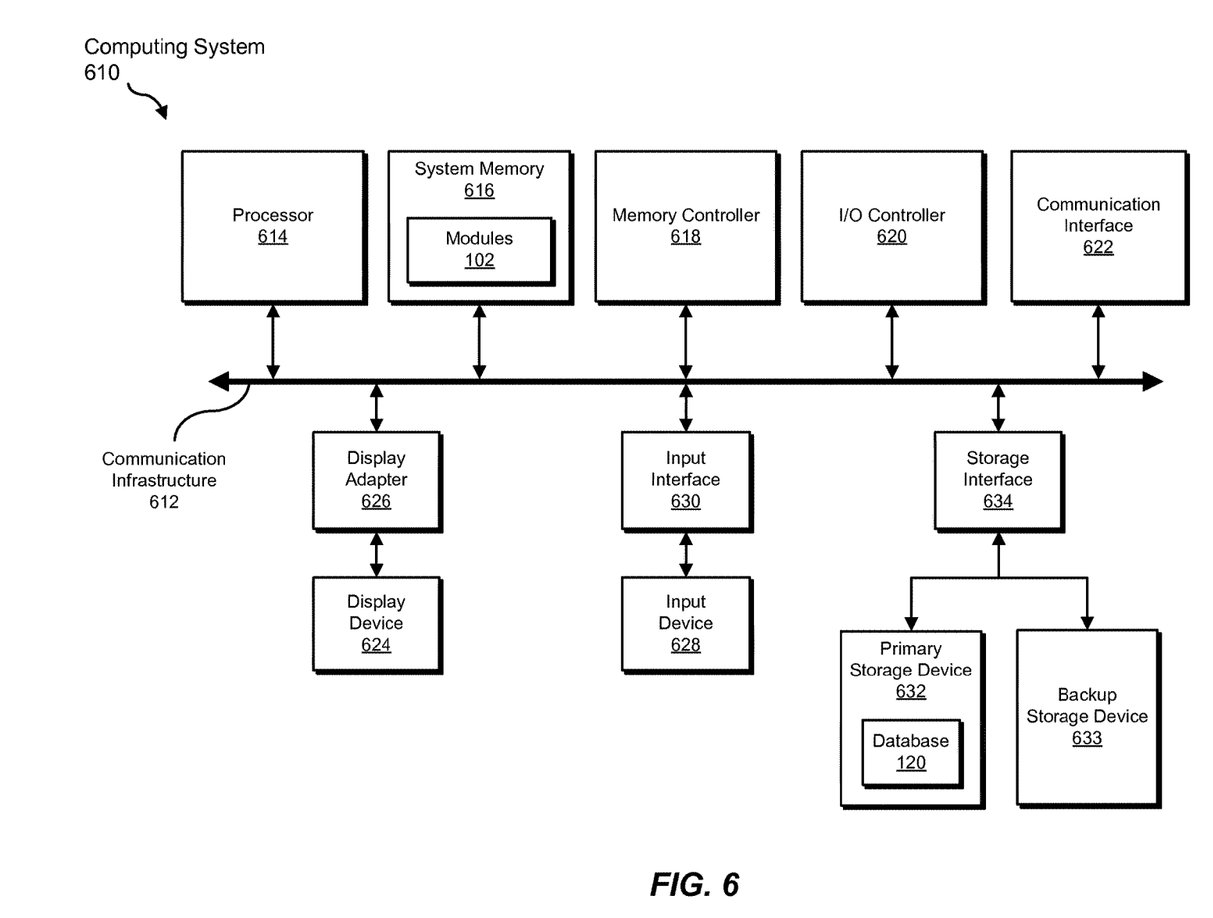
FIG. 6 is a block diagram of an exemplary computing system capable of implementing one or more of the embodiments described and/or illustrated herein.
Figure 7:
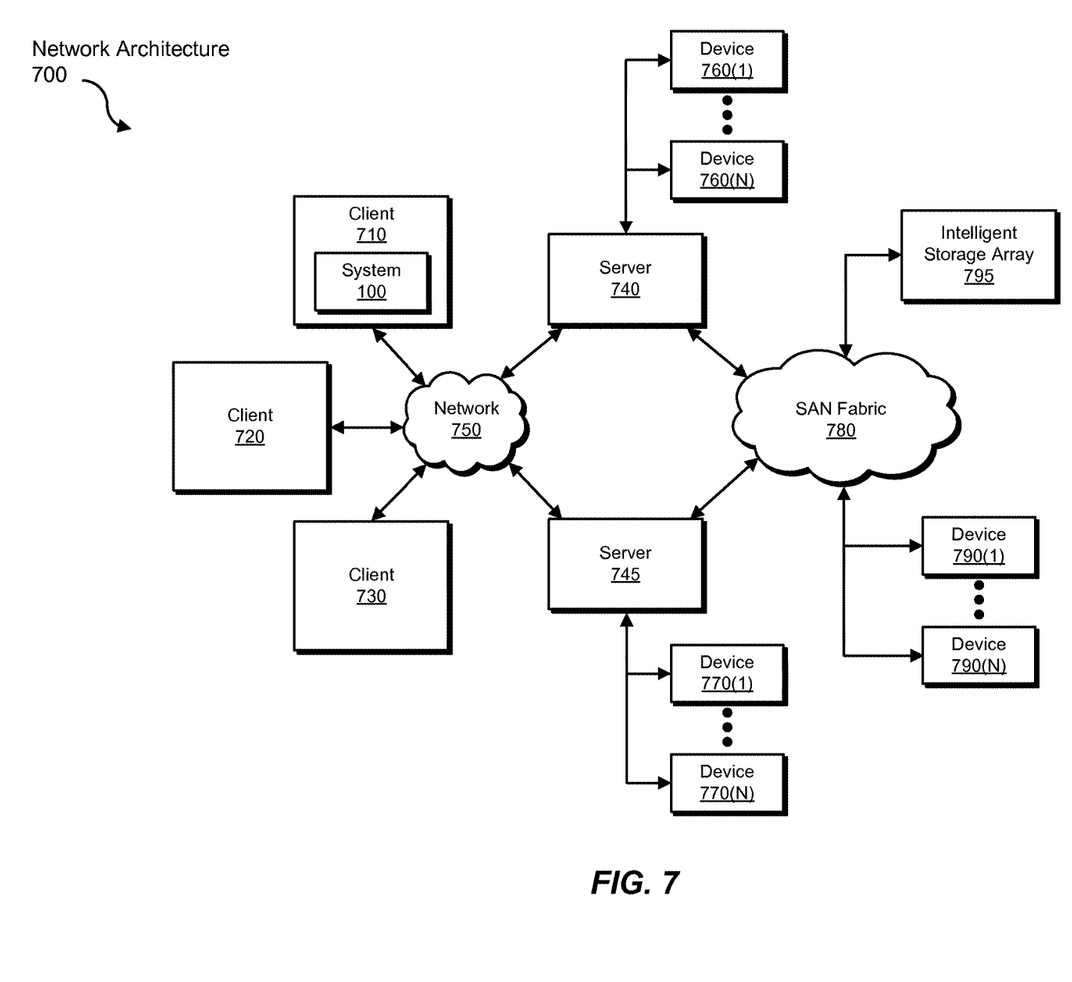
FIG. 7 is a block diagram of an exemplary computing network capable of implementing one or more of the embodiments described and/or illustrated herein.

2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect potential malware using collected data. For example, and as will be described in greater detail below, identification module 104 may identify data 208 to be analyzed for malware. Classification module 106 may classify, using a classifier 124 created by a combination of at least one deep learning neural network and at least one supervised data mining method, data 208 to be analyzed for malware. Determination module 108 may determine, based on a predefined threshold 212, that a classification of data 210 indicates potential malware on computing device 202. Security module 110 may perform a security action 214 based on the determination of potential malware on computing device 202.

In the example of FIG. 2, and as will be explained in greater detail below, training data 122 may first be used to create classifier 124 that classifies potential malware. Identification module 104 may identify data 208 about computing device 202. For example, identification module 104 may collect data about software running on computing device 202. Classification module 106 may then obtain classifier 124 from server 206 via network 204 and classify data 208 with classifier 124 to determine if data 208 may indicate malware on computing device 202. Next, determination module 108 may use predefined threshold 212 to decide that classification of data 210, which classifies data 208, indicates potential malware. Finally, security module 110 may respond to the potential malware infection with security action 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing data and/or creating classifiers based on training data. Examples of server 206 include, without limitation, application servers and database servers configured to provide various database services and/or run certain software applications, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
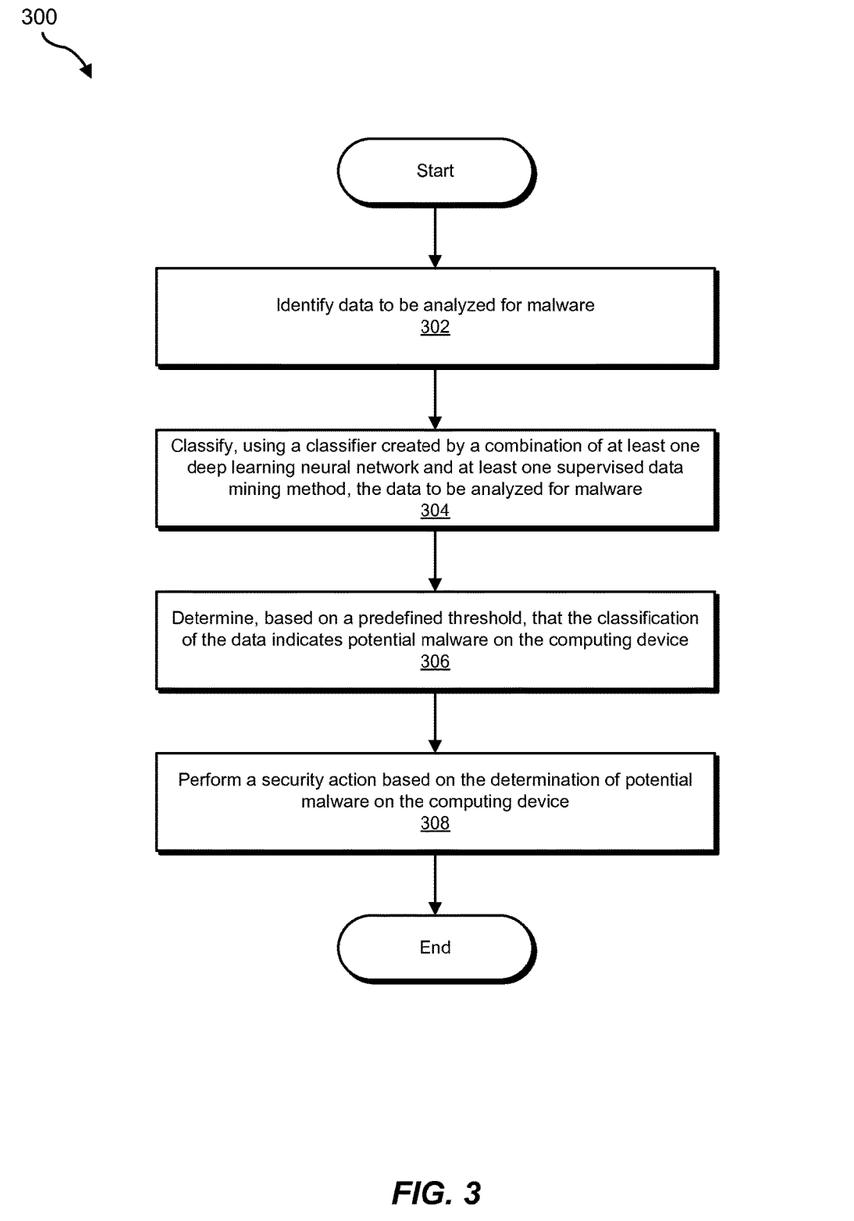
FIG. 3 is a flow diagram of an exemplary method for detecting malware using machine learning.

FIG. 3 is a flow diagram of an exemplary computer-implemented method 300 for detecting malware using machine learning. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify data to be analyzed for malware. For example, identification module 104 may, as part of computing device 202 in FIG. 2, identify data 208 to be analyzed for malware.

Identification module 104 may identify data 208 in a variety of ways. In some examples, as shown in FIG. 2, identification module 104 may identify data 208 by collecting data 208 from computing device 202. In other examples, identification module 104 may receive data 208 from a client device to be analyzed. In further examples, identification module 104 may download data 208 from network 204. In these examples, the downloaded data may include data or software obtained from online marketplaces, such as an app store. Alternatively, identification module 104 may reside separately from computing device 202 and may receive data 208 from computing device 202.

Returning to FIG. 3, at step 304, one or more of the systems described herein may classify, using a classifier created by a combination of at least one deep learning neural network and at least one supervised data mining method, the data to be analyzed for malware. For example, classification module 106 may, as part of computing device 202 in FIG. 2, classify, using classifier 124, data 208 to be analyzed for malware.

Classification module 106 may classify data 208 in a variety of ways. In one embodiment, the deep learning neural network may include multiple layers of artificial neural networks configured to accomplish hierarchical feature extraction, semi-supervised machine learning, and/or unsupervised machine learning. The term "artificial neural network," as used herein, generally refers to a model of connected data that is weighted based on input data and used to estimate a function. For example, a deep belief neural network may use unsupervised training of input data to detect features within the data. The term "feature extraction," as used herein, generally refers to a process of deriving values or vectors that can be analyzed as part of machine learning. Furthermore, in an additional embodiment, the supervised data mining method may include a decision tree, a vector machine, a supervised neural network, an ensemble method, and/or regression analysis.

As used herein, the term "decision tree" generally refers to predictive models with a branching structure that graphs outcomes of observations. The term "vector machine," as used herein, generally refers to learning models that use algorithms to recognize patterns for classification. The term "supervised neural network," generally refers to artificial neural networks that use labeled training data to estimate functions. Furthermore, the term "ensemble method," as used herein, generally refers to combinations of learning algorithms that improve the predictive power of models. Additionally, as used herein, the term "regression analysis" generally refers to statistical models of expected relationships between dependent and independent variables. Additionally or alternatively, other similar data mining methods using supervised machine learning may be used.

In some examples, the combination of the deep learning neural network and the supervised data mining method may include feature extraction with the supervised data mining method and classification of features with the deep learning neural network. In these examples, the feature extraction with the supervised data mining method may include converting training data into leaf nodes and converting the leaf nodes into features using a bag-of-words model. The term "leaf node," as used herein, generally refers to a data value or condition without a child node and used as a part of a tree data structure. The term "bag-of-words model," as used herein, generally refers to a representation of data, particularly text, that may track the presence or frequency of different data (e.g., words) within each document and may weigh them by importance to convert them to features.

Figure 4:
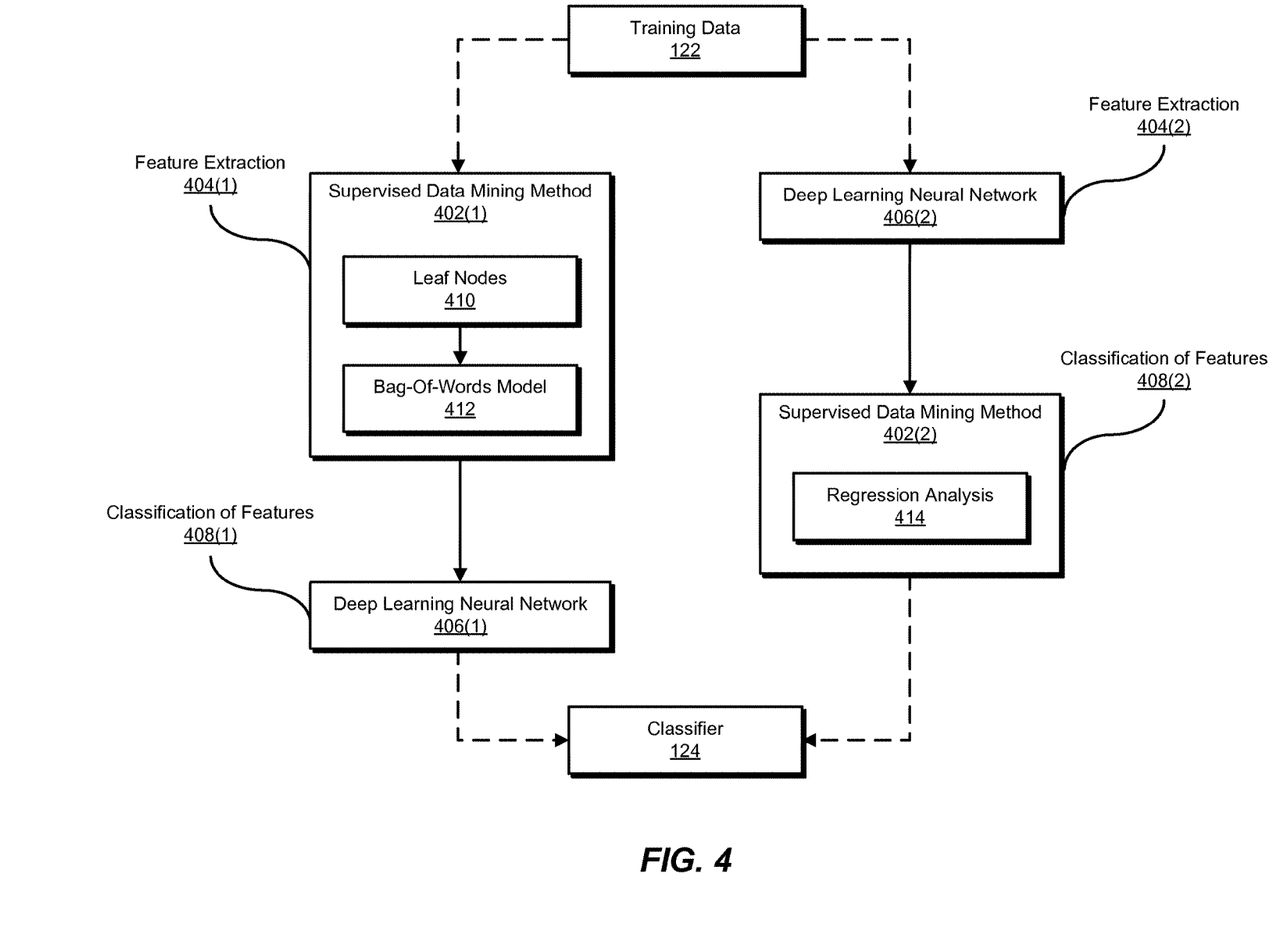
FIG. 4 is an illustration of an exemplary creation of a classifier using a combination of deep learning neural networks and supervised data mining methods.

For example, as shown in FIG. 4, a supervised data mining method 402(1) may convert training data 122 into leaf nodes 410. A bag-of-words model 412 may then convert leaf nodes 410 into features as part of feature extraction 404(1). Next, a deep learning neural network 406(1) may be used to process the features as part of classification of features 408(1) in order to create classifier 124.

In other examples, the combination of the deep learning neural network and the supervised data mining method may include feature extraction with the deep learning neural network and classification of features with the supervised data mining method. In the example of FIG. 4, a deep learning neural network 406(2) may be used for feature extraction 404(2) of training data 122. A supervised data mining method 402(2), which may include regression analysis 414, may then be used for classification of features 408(2) to create classifier 124.

Additionally, classifier 124 may be created with alternate combinations of one or more supervised data mining or deep learning methods. Multiple classifiers may also be created using various combinations of methods, and the best classifier may be selected as classifier 124. Furthermore, classifier 124 may be created on server 206, created on computing device 202 and stored on server 206, and/or created on another computing device and stored on server 206.

Figure 5:
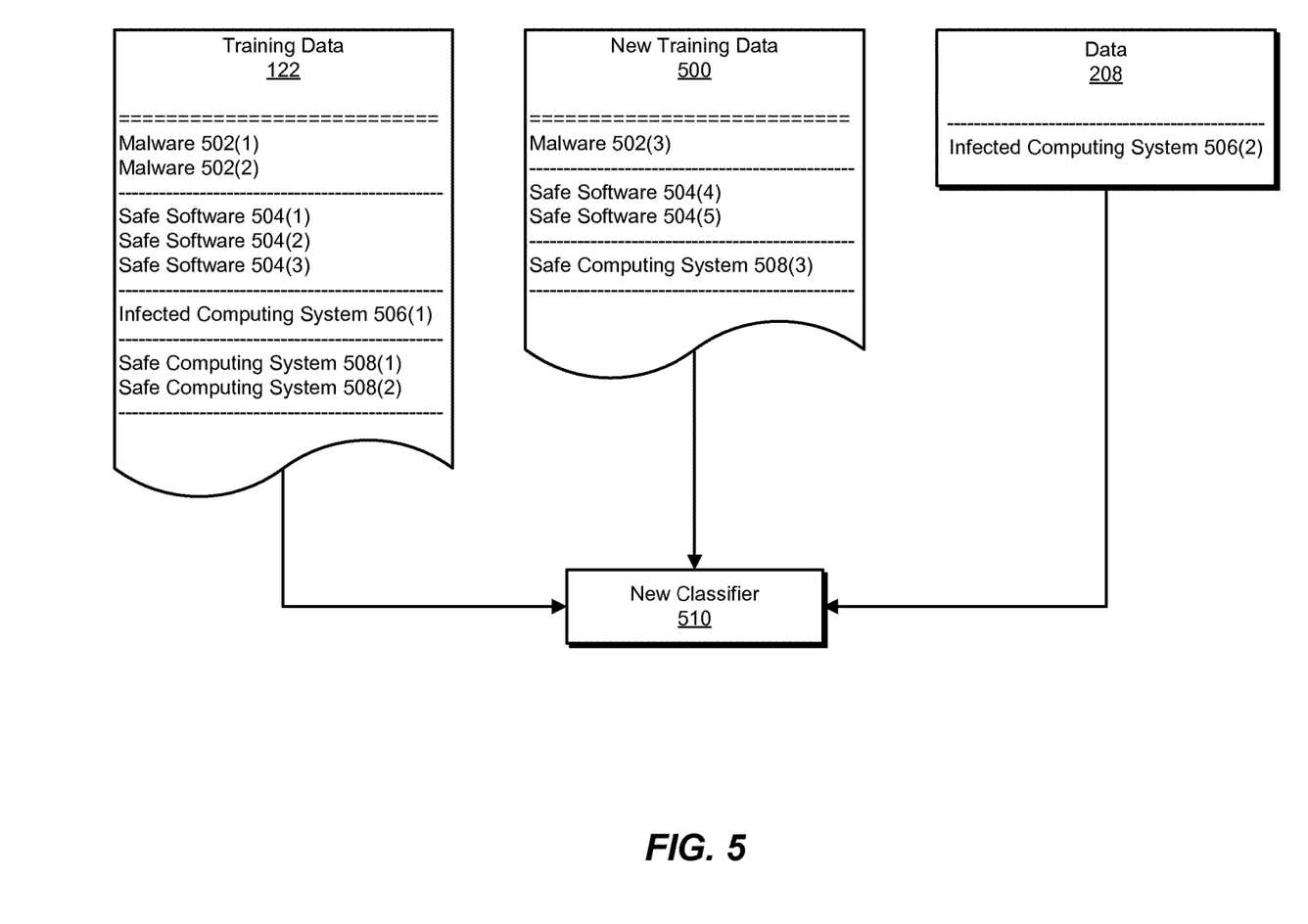
FIG. 5 is an illustration of an exemplary creation of a new classifier with exemplary additional training data.

In one embodiment, and as shown in FIG. 2, classification module 106 may classify data 208 to be analyzed for malware by predicting classification of data 210 with classifier 124 created using training data 122. In this embodiment, training data 122 may include an example of malware, an example of safe software, data about a computing system infected by malware, data about a computing system without malware, and/or any combination of the above. In the example of FIG. 5, training data 122 may include data about a malware 502(1), a malware 502(2), a safe software 504(1), a safe software 504(2), a safe software 504(3), an infected computing system 506(1), a safe computing system 508(1), and a safe computing system 508(2).

Returning to FIG. 3, at step 306, one or more of the systems described herein may determine, based on a predefined threshold, that the classification of the data indicates potential malware on the computing device. For example, determination module 108 may, as part of computing device 202 in FIG. 2, determine, based on predefined threshold 212, that classification of data 210 indicates potential malware on computing device 202.

Determination module 108 may determine that classification of data 210 indicates potential malware in a variety of ways. In some examples, predefined threshold 212 may include a degree of likelihood that classification of data 210 accurately identifies malware. For example, classifier 124 may be determined to accurately identify malware in a certain percentage of cases, and classification of data 210 may pass predefined threshold 212 if the percentage is high enough. In another example, classification of data 210 may represent a likelihood of data 208 indicating malware, and predefined threshold 212 may be used to determine if the likelihood is high enough. Furthermore, multiple classifiers may result in different classifications of data 208, and predefined threshold 212 may determine the best classification to be used in detecting malware on computing device 202.

Returning to FIG. 3, at step 308, one or more of the systems described herein may perform a security action based on the determination of potential malware on the computing device. For example, security module 110 may, as part of computing device 202 in FIG. 2, perform security action 214 based on the determination of potential malware on computing device 202.

Security module 110 may perform security action 214 in a variety of ways. In one example, security module 110 may attempt to mitigate the potential malware threat on computing device 202. Additionally or alternatively, security module 110 may notify a user or administrator of computing device 202 about the potential malware. In examples where data 208 is received from a client device, security module 110 may perform security action 214 on the client device.

In some embodiments, one or more of the systems described herein may create a new classifier, using the combination of the deep learning neural network and the supervised data mining method, with updated training data. Furthermore, in these embodiments, the updated training data may include new training data gathered periodically and/or addition of the data to be analyzed for malware. In the example of FIG. 5, new training data 500 and data 208 may be added to training data 122 to create a new classifier 510. New training data 500 may add additional example data of a malware 502(3), a safe software 504(4), a safe software 504(5), and a safe computing system 508(3). Data 208 may include data for an infected computing system 506(2), such as computing device 202. New classifier 510 created from the updated training data may then be used to classify future data to be analyzed for malware.

As explained above in connection with method 300 in FIG. 3, the disclosed systems and methods may, by using deep learning methods to support and enhance traditional data mining techniques, create a classifier to detect malware on computing devices. For example, the systems and methods described herein may use traditional, supervised machine learning to extract features from training data, such as a collection of documents with identifiable tokens that may be converted to features through a bag-of-words model. Subsequently, a deep learning system, such as a deep belief network, may be trained to classify the features extracted from the training data.

Alternatively, the disclosed systems and methods may use deep learning as a way to preprocess the training data. In this example, deep learning may be able to process unlabeled data that traditional methods cannot, and the results of a deep learning system may then be used as features to be analyzed by a traditional method. The classifiers created through the above methods may be updated by using updated training data. The disclosed systems and methods may further use the classifiers created in the above examples to classify data about a specific computing device in order to analyze the device for malware. Additionally, the systems and methods disclosed herein may perform a security action if the classification of the data determines that there is a potential malware threat.

As detailed above, by using both traditional machine learning and deep learning methods, the disclosed systems and methods may be able to better analyze complex and unlabeled data to train a process to detect malware. In addition, the disclosed systems and methods may better classify data to be analyzed for malware using a classifier resulting from the trained process. Thus, the systems and methods described herein may create classifiers that detect malware more accurately than traditional means.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633.

When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting malware using machine learning.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive training data to be transformed, transform the training data, output a result of the transformation to a storage or output device, use the result of the transformation to create a classifier for malware, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malware using machine learning, at least a portion of the method being performed by a computing device comprising at least one processor, the method comprising:
    identifying, by the computing device, data to be analyzed for malware;
    classifying the data to be analyzed for malware using a classifier created by applying a combination of at least one deep learning neural network, wherein a deep learning neural network comprises multiple layers of artificial neural networks, and at least one supervised data mining method to:
        extract features from training data using one method of the deep learning neural network or the supervised data mining method; and
        classify the features using the other method of the deep learning neural network or the supervised data mining method;
    determining, by the computing device and based on a predefined threshold, that the classification of the data indicates potential malware on the computing device; and
    performing, by the computing device, a security action based on the determination of potential malware on the computing device.

2. The method of claim 1, wherein identifying the data to be analyzed for malware comprises at least one of:
    identifying data on the computing device;
    receiving data from a client device; and
    downloading data from a network.

3. The method of claim 1, wherein the multiple layers of artificial neural networks are configured to accomplish at least one of:
    hierarchical feature extraction;
    semi-supervised machine learning; and
    unsupervised machine learning.

4. The method of claim 1, wherein the supervised data mining method comprises at least one of:
    a decision tree;
    a vector machine;
    a supervised neural network;
    an ensemble method; and
    regression analysis.

5. The method of claim 1, wherein the combination of the deep learning neural network and the supervised data mining method comprises:
    feature extraction with the supervised data mining method; and
    classification of the features with the deep learning neural network.

6. The method of claim 5, wherein the feature extraction with the supervised data mining method comprises:
    converting the training data into leaf nodes; and
    converting the leaf nodes into the features using a bag-of-words model.

7. The method of claim 1, wherein the combination of the deep learning neural network and the supervised data mining method comprises:
    feature extraction with the deep learning neural network; and
    classification of the features with the supervised data mining method.

8. The method of claim 1, wherein classifying the data to be analyzed for malware comprises predicting the classification of the data to be analyzed for malware with the classifier created using the training data.

9. The method of claim 1, wherein the training data comprises at least one of:
an example of malware;
an example of safe software;
data about a computing system infected by malware; and
data about a computing system without malware.

10. The method of claim 1, wherein the predefined threshold comprises a degree of likelihood that the classification of the data to be analyzed for malware accurately identifies malware.

11. The method of claim 1, further comprising creating a new classifier, using the combination of the deep learning neural network and the supervised data mining method, with updated training data.

12. The method of claim 11, wherein the updated training data comprises at least one of:
new training data gathered periodically; and
addition of the data to be analyzed for malware.

13. A system for detecting malware using machine learning, the system comprising:
an identification module, stored in memory, that identifies data to be analyzed for malware;
a classification module, stored in the memory, that classifies the data to be analyzed for malware using a classifier created by applying a combination of at least one deep learning neural network, wherein a deep learning neural network comprises multiple layers of artificial neural networks, and at least one supervised data mining method to:
extract features from training data using one method of the deep learning neural network or the supervised data mining method; and
classify the features using the other method of the deep learning neural network or the supervised data mining method;
a determination module, stored in the memory, that determines, based on a predefined threshold, that the classification of the data indicates potential malware on a computing device;
a security module, stored in the memory, that performs a security action based on the determination of potential malware on the computing device; and
at least one physical processor that executes the identification module, the classification module, the determination module, and the security module.

14. The system of claim 13, wherein the identification module identifies the data to be analyzed for malware by at least one of:
identifying data on the computing device;
receiving data from a client device; and
downloading data from a network.

15. The system of claim 13, wherein the multiple layers of artificial neural networks are configured to accomplish at least one of:
hierarchical feature extraction;
semi-supervised machine learning; and
unsupervised machine learning.

16. The system of claim 13, wherein the supervised data mining method comprises at least one of:
a decision tree;
a vector machine;
a supervised neural network;
an ensemble method; and
regression analysis.

17. The system of claim 13, wherein the combination of the deep learning neural network and the supervised data mining method comprises:
feature extraction with the supervised data mining method; and
classification of the features with the deep learning neural network.

18. The system of claim 17, wherein the feature extraction with the supervised data mining method comprises:
converting the training data into leaf nodes; and
converting the leaf nodes into the features using a bag-of-words model.

19. The system of claim 13, wherein the combination of the deep learning neural network and the supervised data mining method comprises:
feature extraction with the deep learning neural network; and
classification of the features with the supervised data mining method.

20. A non-transitory computer-readable medium comprising one or more computer-executable instructions that, when executed by at least one processor of a computing device, cause the computing device to:
identify data to be analyzed for malware;
classify the data to be analyzed for malware using a classifier created by applying a combination of at least one deep learning neural network, wherein a deep learning neural network comprises multiple layers of artificial neural networks, and at least one supervised data mining method to:
extract features from training data using one method of the deep learning neural network or the supervised data mining method; and
classify the features using the other method of the deep learning neural network or the supervised data mining method;
determine, based on a predefined threshold, that the classification of the data indicates potential malware on the computing device; and
perform a security action based on the determination of potential malware on the computing device.

* * * * *

UNITED STATES PATENT AND TRADEMARK OFFICE
CERTIFICATE OF CORRECTION

PATENT NO. : 10,250,617 B1  
APPLICATION NO. : 14/948341  
DATED : April 2, 2019  
INVENTOR(S) : Andrew Gardner et al.

Page 1 of 1

It is certified that error appears in the above-identified patent and that said Letters Patent is hereby corrected as shown below:

On the Title Page

Item (72), Inventors, Line 1, delete "Rosewell," and insert -- Roswell, --, therefor.

Signed and Sealed this  
Fourth Day of June, 2019

Andrei Iancu  
*Director of the United States Patent and Trademark Office*